(12) United States Patent
Hunt (10) Patent No.: US 12,137,630 B2
(45) Date of Patent: Nov. 12, 2024

(54) SENSOR ASSEMBLY FOR AN AGRICULTURAL HEADER

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

(*) Notice: Subject to any disclaimer, the term of this patent is extended or adjusted under 35 U.S.C. 154(b) by 1009 days.

(21) Appl. No.: 16/724,730

(22) Filed: Dec. 23, 2019

(65) Prior Publication Data

US 2021/0185916 A1   Jun. 24, 2021

(51) Int. Cl.
  *A01D 41/14*   (2006.01)
  *A01D 75/18*   (2006.01)

(52) U.S. Cl.
  CPC ........... *A01D 41/141* (2013.01); *A01D 75/18* (2013.01)

(58) Field of Classification Search
  CPC ..... A01D 41/141; A01D 41/127; A01D 75/18
  See application file for complete search history.

(56) References Cited

U.S. PATENT DOCUMENTS

| | | | |
|---|---|---|---|
| 3,946,825 A * | 3/1976 | Gail | A01D 41/1278 180/401 |
| 4,126,984 A | 11/1978 | Gail | |
| 4,507,910 A | 4/1985 | Thornley et al. | |
| 5,155,983 A | 10/1992 | Sheehan et al. | |
| 5,155,984 A | 10/1992 | Sheehan | |
| 6,389,785 B1 * | 5/2002 | Diekhans | A01B 69/008 172/4.5 |
| 6,397,569 B1 | 6/2002 | Homburg et al. | |
| 6,791,488 B2 | 9/2004 | Diekhans et al. | |
| 6,826,894 B2 | 12/2004 | Thiemann et al. | |
| 7,155,888 B2 * | 1/2007 | Diekhans | A01D 41/1278 56/10.2 R |
| 8,381,502 B2 | 2/2013 | Dunn | |
| 8,452,501 B1 | 5/2013 | Lange et al. | |
| 8,843,283 B2 | 9/2014 | Strelioff et al. | |
| 9,585,309 B2 | 3/2017 | Posselius et al. | |
| 9,807,933 B2 | 11/2017 | Boyd et al. | |
| 9,807,938 B2 | 11/2017 | Wilken et al. | |

(Continued)

FOREIGN PATENT DOCUMENTS

| | | |
|---|---|---|
| DE | 2411153 A1 | 9/1975 |
| GB | 2173309 A | 10/1986 |

OTHER PUBLICATIONS

International Search for PCT Application No. PCT/US2020/064277 dated Jul. 8, 2021 (five pages).

(Continued)

*Primary Examiner* — Adam J Behrens
(74) *Attorney, Agent, or Firm* — Peter K. Zacharias; Rebecca L. Henkel; Rickard K. DeMille (57) ABSTRACT

A sensor assembly for an agricultural header includes a sensor configured to detect features of an unharvested crop field. The sensor is mounted to a bracket that is coupled to a reel arm or to a frame of the agricultural header. The sensor assembly is configured to position and/or to orient the sensor such that the sensor detects only the features of the unharvested crop field within a detected area that is completely within a lateral extent of the agricultural header.

19 Claims, 7 Drawing Sheets

(56) References Cited

U.S. PATENT DOCUMENTS

| | | |
|---|---|---|
| 10,117,374 B2 | 11/2018 | Boydens et al. |
| 10,318,138 B2 * | 6/2019 | Schøler .................... H04Q 9/00 |
| 11,375,663 B2 * | 7/2022 | Rotole ................... A01D 34/07 |
| 2003/0184747 A1 | 10/2003 | Diekhans et al. |
| 2004/0006958 A1 | 1/2004 | Thiemann et al. |
| 2013/0345937 A1 | 12/2013 | Strelioff et al. |
| 2015/0305238 A1 | 10/2015 | Klausmann et al. |
| 2016/0106038 A1 | 4/2016 | Boyd et al. |
| 2017/0013777 A1 | 1/2017 | Posselius et al. |
| 2017/0303470 A1 | 10/2017 | Briquet-Kerestedjian et al. |
| 2019/0021226 A1 | 1/2019 | Dima et al. |
| 2019/0261560 A1 | 8/2019 | Jelenkovic |
| 2019/0307070 A1 | 10/2019 | Dima et al. |
| 2020/0031270 A1 | 1/2020 | Beschorn et al. |
| 2020/0068804 A1 | 3/2020 | Barther et al. |
| 2021/0015040 A1 | 1/2021 | Neitemeier et al. |
| 2021/0137006 A1 | 5/2021 | Shearer et al. |
| 2021/0185876 A1 | 6/2021 | Hunt et al. |
| 2022/0039316 A1 | 2/2022 | Seidel |
| 2022/0304228 A1 * | 9/2022 | Hunt .................. A01D 41/1278 |

OTHER PUBLICATIONS

"Header Height Control for Grain from Headsight", accessed Jul. 18, 2022, 5 pgs., Headsight Harvesting Solutions.
"Terrahawk Horizon—Horizon Manual 09062203a", 2018, 38 pages, Headsight Harvesting Solutions.

\* cited by examiner

SENSOR ASSEMBLY FOR AN AGRICULTURAL HEADER

BACKGROUND

The present disclosure relates generally to a sensor assembly for an agricultural header.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

Certain headers may also include a reel assembly, which may include a reel having multiple fingers extending from a central framework. The central framework is driven to rotate, such that the fingers move in a circular pattern. The fingers are configured to engage the crops, thereby preparing the crops to be cut by the cutter bar assembly and/or urging the cut crops to move toward the belt(s). The reel is typically supported by multiple arms extending from a frame of the header. The reel assembly may include one or more actuators configured to drive the arms to rotate, thereby adjusting the position of the reel relative to the frame of the header.

BRIEF DESCRIPTION

In one embodiment, a sensor assembly for an agricultural header includes a sensor configured to detect a feature of an unharvested crop field and a bracket. The bracket includes a first end portion configured to couple to a reel arm or to a frame of the agricultural header and a second end portion coupled to the sensor. The sensor assembly is configured to orient the sensor such that a central axis of a field of view of the sensor is at a non-parallel angle relative to a vertical axis of the agricultural header while the sensor assembly is coupled to the agricultural header.

In one embodiment, a sensor assembly for an agricultural header includes a sensor configured to detect a feature of an unharvested crop field and a bracket. The bracket includes a first end portion configured to couple to a reel arm of the agricultural header and a second end portion coupled to the sensor. The bracket is configured to position the sensor laterally-inwardly relative to the reel arm while the bracket is coupled to the reel arm.

In one embodiment, a header for an agricultural harvester includes a bracket coupled to a reel arm or to a frame of the header. The header also includes a sensor coupled to the bracket, and the sensor is oriented relative to the header to enable the sensor to detect a detected area that is completely within a lateral extent of the header.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
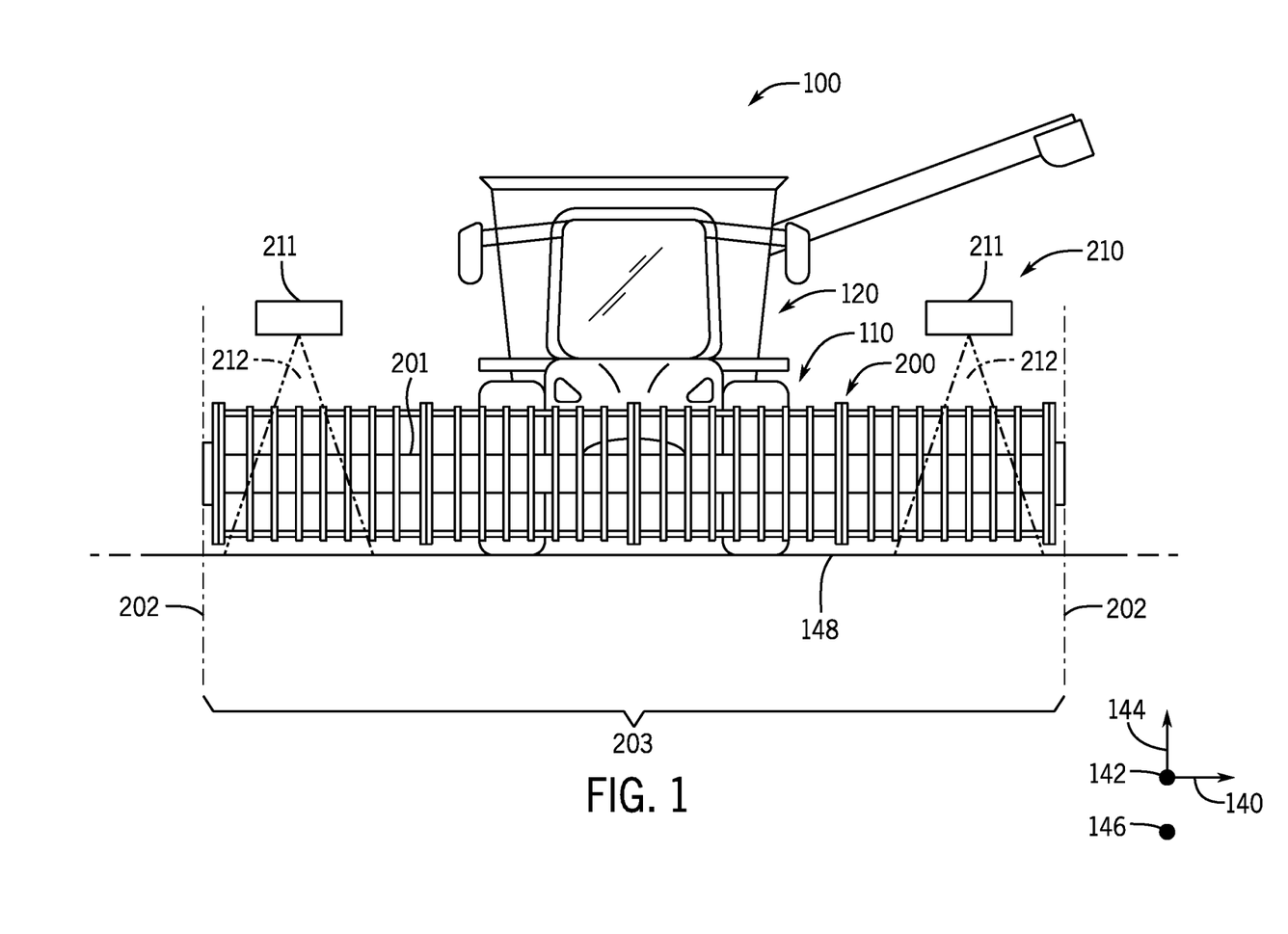
FIG. 1 is a front view of a harvester having a header and a sensor assembly, wherein each sensor of the sensor assembly is positioned laterally-inwardly of lateral edges of the header, in accordance with embodiments of the present disclosure.

Turning to the drawings, FIG. 1 is a front view of an embodiment of a harvester 100 (e.g., agricultural harvester) having a header 200 (e.g., agricultural header). The harvester 100 also includes a chassis 110 configured to support the header 200 and an agricultural crop processing system 120. As described in greater detail below, the header 200 is configured to cut crops and to transport the cut crops toward an inlet of the agricultural crop processing system 120 for further processing of the cut crops. The agricultural crop processing system 120 receives cut crops from the header 200 and separates desired crop material from crop residue. For example, the agricultural crop processing system 120 may include a thresher having a cylindrical threshing rotor that transports the crops in a helical flow path through the harvester 100. In addition to transporting the crops, the thresher may separate certain desired crop material (e.g., grain) from the crop residue (e.g., husks and pods) and may enable the desired crop material to flow into a cleaning system located beneath the thresher. The cleaning system may remove debris from the desired crop material and transport the desired crop material to a storage compartment within the harvester 100. The crop residue may be transported from the thresher to a crop residue handling system, which may remove the crop residue from the harvester 100 via a crop residue spreading system positioned at the aft end of the harvester 100. To facilitate discussion, the harvester 100 and/or its components may be described with reference to a lateral axis or direction 140, a longitudinal axis or direction 142, and a vertical axis or direction 144. The harvester 100 and/or its components may also be described with reference to a direction of travel 146 (e.g., over ground 148).

The header 200 includes a cutter bar assembly configured to cut the crops within the field. The header 200 also includes a reel assembly configured to engage the crops to prepare the crops to be cut by the cutter bar assembly and/or to urge crops cut by the cutter bar assembly onto belts that convey the cut crops toward the inlet of the agricultural crop processing system 120. The reel assembly includes a reel having multiple fingers extending from a central framework. The central framework is driven to rotate, such that the fingers engage the crops and urge the crops toward the cutter bar assembly and the belts. Additionally, the reel may be supported by multiple arms (e.g., reel arms) that are coupled to a frame 201 of the header 200. Each arm of the multiple arms may be coupled to the frame 201 via a respective pivot joint. For example, one pivot joint is configured to enable a first arm of the multiple arms to pivot (e.g., about the lateral axis 140) relative to the frame 201 of the header 200, and another pivot joint is configured to enable a second arm of the multiple arms to pivot (e.g., about the lateral axis 140) relative to the frame 201 of the header 200.

In the disclosed embodiments, the harvester 100 also includes a sensor assembly 210. The sensor assembly 210 may be coupled to the header 200. For example, the sensor assembly 210 may be coupled to the arms of the reel assembly and/or to the frame 201 of the header 200. The sensor assembly 210 may include multiple sensors 211 that are configured to detect features of an unharvested crop field (e.g., crop features and/or terrain features, such as a height of the crops, a density of the crops, a color of the crops, and/or surface features of the ground 148) as the harvester 100 travels through the field. The sensors 211 may send signals indicative of the features of the unharvested crop field to an electronic controller (e.g., having a processor and memory) for processing. It should be appreciated that the sensors 211 may any suitable type of sensors, such as acoustic sensors, optical sensors, radar sensors, or the like. It should also be appreciated that the sensor assembly 210 may include any number of sensors (e.g., 1, 2, 3, 4, 5 or more) distributed laterally across the header 200.

As shown, the sensors 211 may be positioned laterally-inwardly of lateral edges 202 (e.g., laterally-outermost edges; laterally-outermost point) of the header 200. For example, the sensors 211 may be coupled to brackets (e.g., extension assemblies) that are coupled to and extend from the arms of the reel assembly. The brackets may bend or extend laterally-inwardly to position the sensors 211 laterally-inwardly of the lateral edges 202 of the header 200. In this way, the sensors 211 may be positioned to effectively detect features of the unharvested crop field that are forward of the header 200 and/or within a lateral extent 203 (e.g., lateral width) of the header 200. In some embodiments, the sensors 211 may be positioned to exclusively (e.g., only) detect features of the unharvested crop field that are forward of the header 200 and/or within the lateral extent 203 of the header 200. For example, each sensor 211 has a field of view 212 (e.g., an angle through which the sensor 211 is sensitive to electromagnetic radiation) and may be positioned to detect features of the unharvested crop field over a detected area 213 (e.g., crop area or ground area) that is substantially or completely within the lateral extent 203 of the header 200. In this way, the disclosed embodiments may enable an operator or the electronic controller to receive information about relevant features of the unharvested crop field (e.g., based only on the features of the unharvested crop field forward of the header 200 and/or within the lateral extent 203 of the header 200, and not based on or adversely influenced by features of the unharvested crop field outside of the lateral extent 203 of the header 200) from the sensors 211 and/or to properly position components of the header 200 (e.g., the cutter bar, the reel assembly) based on relevant features of the unharvested crop field.

Figure 2:
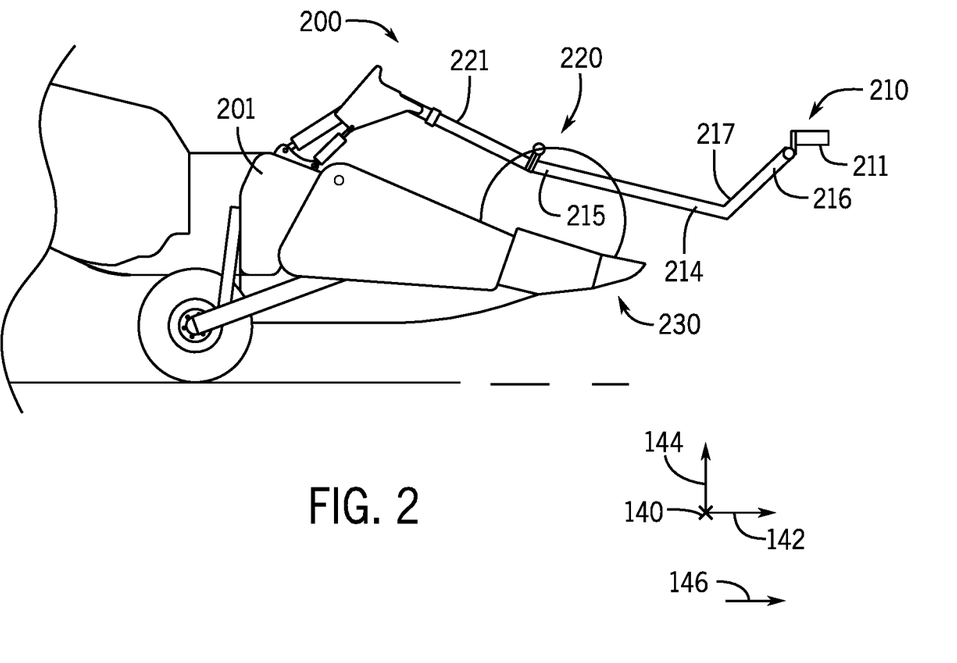
FIG. 2 is a side view of the header and the sensor assembly that may be used in the harvester of FIG. 1, wherein the sensor assembly is coupled to a reel arm via a bracket that bends laterally-inwardly, in accordance with embodiments of the present disclosure.

FIG. 2 is a side view of an embodiment of the header 200 having the sensor assembly 210, a reel assembly 220, and a cutter bar assembly 230. Features of the reel assembly 220 and the cutter bar assembly 230 will be described in more detail below with reference to FIG. 3.

As shown, the sensors 211 may be positioned to facilitate detection of features of the unharvested crop field that are forward of the header 200 and/or within the lateral extent 203 of the header 200, as described above with reference to FIG. 1. In particular, the sensor assembly 210 includes brackets 214 (e.g., extension assemblies). Each bracket 214 includes a first end 215 that is coupled to (e.g., directly coupled to; in contact with; extends from) an arm 221 of the reel assembly 220 and a second end 216 that is coupled to (e.g., directly coupled to; in contact with) the sensor 211 (e.g., a housing that houses or supports sensing components of the sensor 211). The bracket 214 may extend forward of the reel assembly 220 and the cutter bar assembly 230. At least the brackets 214 that are coupled to the laterally-outer arms 221 (e.g., outer-most arms 221) may also extend and/or bend laterally-inwardly to position the respective sensor 211 laterally-inwardly of the lateral edges 202 of the header 200. For example, the bracket 214 may bend laterally-inwardly at an elbow 217. However, it should be appreciated that an entirety of the bracket 214 may extend laterally-inwardly from the arm 221 or the bracket 214 have any of a variety of other configurations that position the sensor 211 laterally-inwardly of the lateral edges 202 of the header 200.

Figure 3:
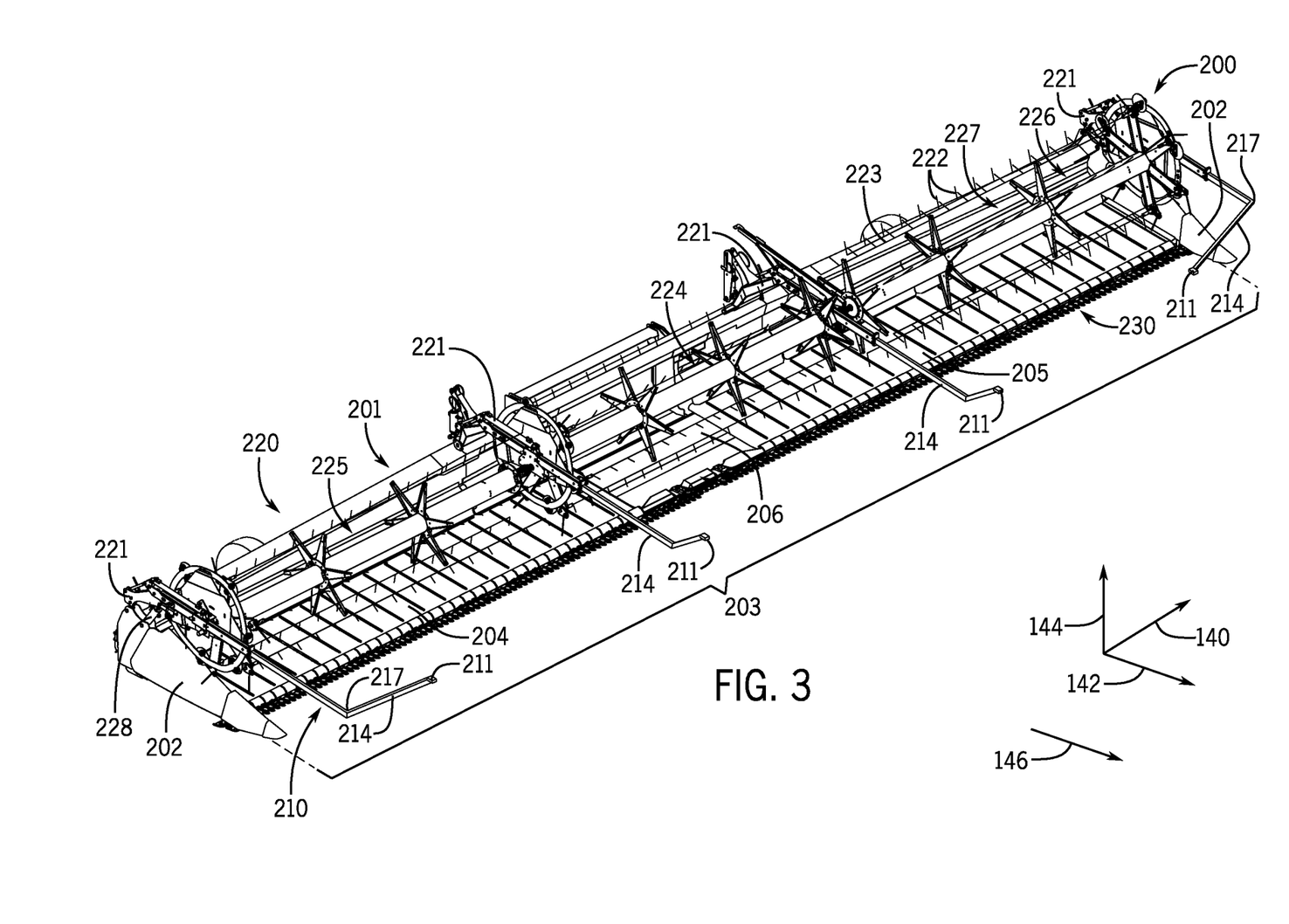
FIG. 3 is a perspective view of the header and the sensor assembly of FIG. 2, in accordance with embodiments of the present disclosure.

FIG. 3 is a perspective view of the header 200 and the sensor assembly 210 of FIG. 2. The cutter bar assembly 230 is positioned at a forward end of the header 200 relative to the longitudinal axis 142 of the header 200. The cutter bar assembly 230 extends laterally along a substantial portion of the width of the header 200 (e.g., approximately 100, 95, 90, 85, 80, or 75 percent of the lateral extent 203 of the header 200). As the harvester 100 is driven through the field, the cutter bar assembly 230 engages and cuts crops within the field.

In the illustrated embodiment, the header 200 includes a first lateral belt 204 on a first lateral side of the header 200 and a second lateral belt 205 on a second lateral side of the header 200, opposite the first lateral side. Each belt is driven to rotate by a suitable drive mechanism, such as an electric motor or a hydraulic motor. The first lateral belt 204 and the second lateral belt 205 are driven such that the top surface of each belt moves laterally inward. In addition, the header 200 includes a longitudinal belt 206 positioned between the first lateral belt 204 and the second lateral belt 205 along the lateral axis 140. The longitudinal belt 206 is driven to rotate by a suitable drive mechanism, such as an electric motor or a hydraulic motor. The longitudinal belt 206 is driven such that the top surface of the longitudinal belt 206 moves rearwardly relative to the direction of travel 146.

In the illustrated embodiment, the crops cut by the cutter bar assembly 230 are directed toward the belts at least in part by the reel assembly 220, thereby substantially reducing the possibility of the cut crops falling onto the surface of the field. The reel assembly 220 includes a reel 227 having multiple fingers 222 extending from a central framework 223. The central framework 223 is driven to rotate such that the fingers 222 move (e.g., in a circular pattern). The fingers 222 are configured to engage the crops and urge the cut crops toward the belts. The cut crops that contact the top surface of the lateral belts 204, 205 are driven laterally inwardly to the longitudinal belt 206 due to the movement of the lateral belts 204, 205. In addition, cut crops that contact the longitudinal belt 206 and the cut crops provided to the longitudinal belt 206 by the lateral belts 204, 205 are driven rearwardly relative to the direction of travel 146 due to the movement of the longitudinal belt 206. Accordingly, the belts move the cut agricultural crops through an opening in the header 200 to the inlet of the agricultural crop processing system 120 (FIG. 1).

In the illustrated embodiment, the reel 227 includes multiple sections coupled to one another. In particular, the reel 227 includes a center section 224 (e.g., positioned forward of a center section 207 of the frame 201 of the header 200 relative to the direction of travel 146), a first wing section 225, and a second wing section 226. In the illustrated embodiment, each section of the reel 227 is supported by one or more arms 221 that are coupled to the frame 201 of the header 200. While the reel 227 includes three sections 224, 225, 226 coupled to the frame 201 of the header 200 via four arms 221, it should be appreciated that the reel 227 may include any number of sections coupled to the frame 201 of the header 200 via any number of arms 221 (e.g., one section coupled to the frame 201 of the header 200 via two arms 221; two sections coupled to the frame 201 of the header 200 via three arms 221; four sections coupled to the frame 201 of the header 200 via five arms 221).

As discussed in detail below, regardless of the number of arms 221, each arm 221 is pivotally coupled to the frame 201 of the header 200 via a respective pivot joint. The pivot joints are configured to enable the arms 221 to pivot (e.g., about the lateral axis 140) relative to the frame 201 of the header 200. An actuator 228 may be coupled to each arm 221 and configured to drive the respective arm 221 to rotate about the respective pivot joint, thereby controlling a position of the reel 227 relative to the frame 201 of the header 200 along the vertical axis 144. Such a configuration may enable the reel 227 to be positioned at an appropriate position along the vertical axis 144 to engage the crops to prepare the crops to be cut by the cutter bar assembly 230 and/or to urge the cut crops toward the belts 204, 205, 206, for example. In some embodiments, each section of the reel 227 may also be configured to slide along its respective arm(s) 221 to enable the reel 227 to move along the longitudinal axis 142 relative to the frame 201 of the header 200. Such a configuration may enable at least a portion of the reel assembly 220 to be positioned forward of the cutter bar assembly 230 relative to the direction of travel 146 to enable the reel assembly 220 to engage the crop to prepare the crop to be cut by the cutter bar assembly 230, for example.

As noted above, the sensor assembly 210 may be coupled to or included as part of the reel assembly 220. The sensor assembly 210 may include one or more brackets 214 and one or more sensors 211. In the illustrated embodiment, each of the arms 221 is coupled to a respective bracket 214 that supports a respective sensor 211. However, only some of the arms 221 may be coupled to a respective bracket 214 that supports a respective sensor 211. For example, only the laterally-outer arms 221 may be coupled to a respective bracket 214 and a respective sensor 211, only the laterally-inner arm(s) 221 may be coupled to a respective bracket 214 and a respective sensor 211, and/or every other arm 221 (e.g., non-adjacent or alternating arms) may be coupled to a respective bracket 214 and a respective sensor 211. As discussed in more detail below, regardless of the number of brackets 214 and sensors 211 included in the sensor assembly 210, the sensors 211 may be positioned laterally-inwardly of the lateral edges 202 of the header 200. For example, as shown, at least the brackets 214 coupled to the laterally-outer arms 221 may bend laterally-inwardly to position the respective sensor 211 laterally-inwardly of the lateral edges 202 of the header 200. In the illustrated embodiment, the bracket 214 bends at the elbow 217. However, as noted above, it should be appreciated that an entirety of the bracket 214 may extend laterally-inwardly from the arm 221 or the bracket 214 or have any of a variety of other configurations that position the sensor 211 laterally-inwardly of the lateral edges 202 of the header 200.

Figure 4:
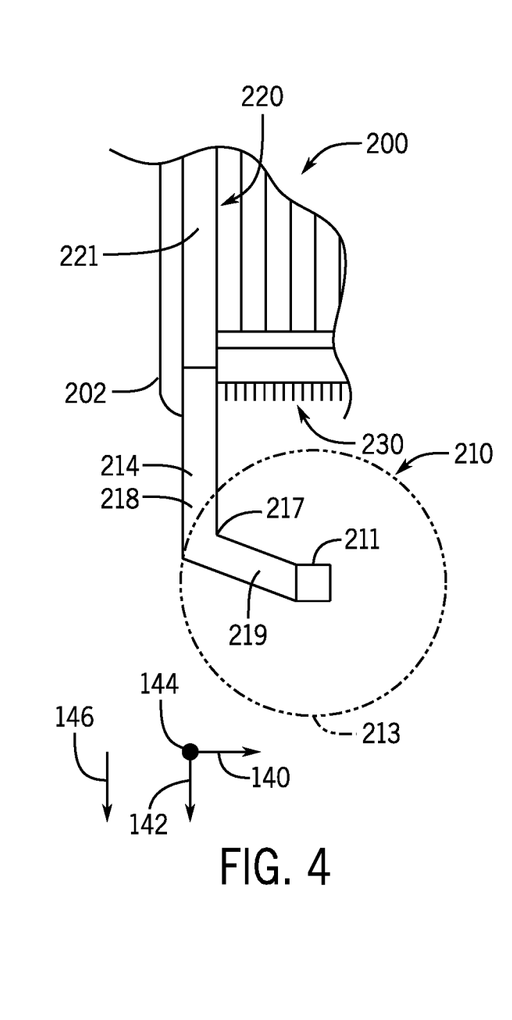
FIG. 4 is a top view of a portion of the header and the sensor assembly of FIG. 2, in accordance with embodiments of the present disclosure.

FIG. 4 is a top view of a portion of the header 200 and the sensor assembly 210 of FIG. 2. As shown, the bracket 214 is coupled to the arm 221. In particular, the bracket 214 extends forward from the arm 221 to position the respective sensor 211 forward of the cutter bar assembly 230 (e.g., relative to the direction of travel 146) and/or extends laterally-inwardly via a bend to position the respective sensor 211 laterally-inwardly of the lateral edges 202 of the header 200. In the illustrated embodiment, the bracket 214 bends at the elbow 217. For example, the bracket 214 includes a longitudinally-extending portion 218 and a laterally-extending portion 219 that are joined at the elbow 217. The bend (e.g., at the laterally-inner edge of the elbow 217) may have any suitable angle, such as between about 10 to 90, 20 to 80, 30 to 70, or 40 to 60 degrees.

As shown, the sensor 211 may be positioned such that the detected area 213 is completely laterally-inward of the lateral edge 202 of the header 200. Thus, the sensor 211 only detects the relevant features of the unharvested crop field that the header 200 will travel over as the header 200 continues its current pass through the field. In some embodiments, a laterally-outer edge of the detected area 213 may substantially align with the lateral edge 202 of the header 200 along the lateral axis 140 (e.g., less than 5, 10, 15, or 20 percent of the detected area extends laterally-outwardly of the lateral edge 202 of the header). It should be appreciated that the sensor 211 may be positioned such that the detected area 213 is substantially laterally-inward of the lateral edge 202 of the header 200 (e.g., at least 95, 90, 85, 80, 75, 70, 65, 60, 55, or 50 percent of the detected area 213 is laterally-inward of the lateral edge 202 of the header 200).

As noted above, the arm 221 may move vertically to position the reel 227 at an appropriate position relative to the crop in the field. As the arm 221 moves vertically, the bracket 214 and the sensor 211 may also move vertically. The disclosed embodiments may account for the vertical position of the sensor 211 relative to the ground 148 (FIG. 1) or other detected object (e.g., crops) to keep the detected area 213 substantially or completely laterally-inward of the lateral edges 202 of the header 200 as the header 200 travels through the field. In some embodiments, the sensor 211 may have the field of view 212 and be positioned on the bracket 214 so that the detected area 213 is always substantially or completely laterally-inward of the lateral edges 202 of the header 200, regardless of the vertical position of the sensor 211. For example, at a first vertical position (e.g., limit position, lowest position), the sensor 211 may detect a relatively smaller detected area 213 that is completely within the lateral edges 202 of the header 200. And at a second vertical position (e.g., limit position, highest position), the sensor 211 may detect a relatively larger detected area 213 that is also completely within the lateral edges 202 of the header 200.

In some embodiments, features of the sensor assembly 210 may be adjustable to account for the vertical position of the sensor 211. For example, the field of view 212 of the sensor 211 may be adjustable based on the vertical position of the sensor 211, which may be determined based on feedback from the sensor 211 itself (e.g., data obtained by the sensor 211 is indicative of the vertical position of the sensor 211) and/or based on the position of the arm 221. In some embodiments, the electronic controller may receive an indication of the vertical position of the sensor 211 and then adjust the field of view 212 of the sensor 211 to keep the detected area 213 within the lateral edges 202 of the header 200. Thus, the field of view 212 of the sensor 211 may adjust automatically in response to changes in the vertical position of the sensor 211.

Figures 5, 6:
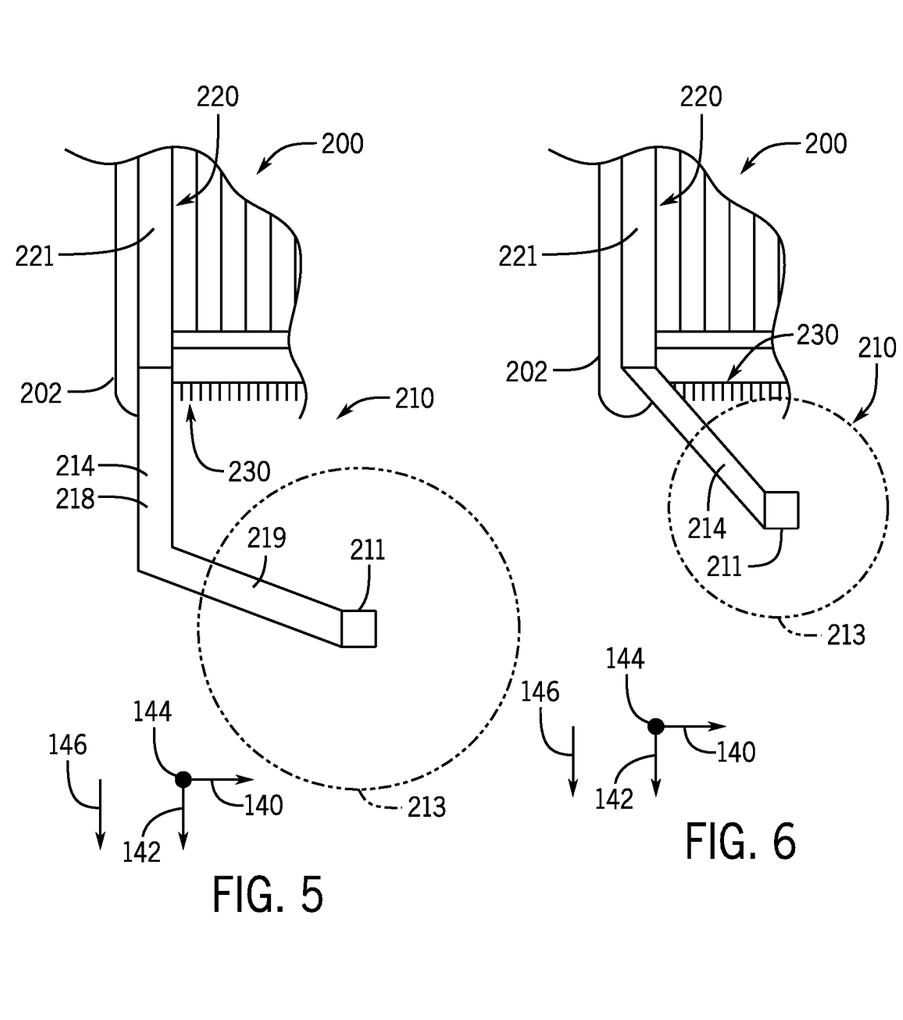
FIG. 5 is a top view of a portion of the header and the sensor assembly of FIG. 2, wherein the bracket is adjustable, in accordance with embodiments of the present disclosure.
FIG. 6 is a top view of a portion of the header and the sensor assembly that may be used in the harvester of FIG. 1, wherein the sensor assembly is coupled to a reel arm via a bracket that extends laterally-inwardly, in accordance with embodiments of the present disclosure.

As shown in FIG. 5, in some embodiments, the bracket 214 may be adjustable. For example, in FIG. 5 as compared to FIG. 4, the bracket 214 is adjusted to move the sensor 211 further laterally-inwardly relative to the lateral edge 202 of the header 200 in response to the sensor 211 moving vertically higher above the features of the unharvested crop field. The bracket 214 may be adjustable in any of a variety of ways, such as a telescoping arm that extends and retracts (e.g., the laterally-extending portion 219 may be a telescoping arm). In some embodiments, the electronic controller may receive an indication of the vertical position of the sensor 211 and then instruct an actuator to adjust the bracket 214 to keep the detected area 213 within the lateral edges 202 of the header 200. Thus, the bracket 214 may adjust automatically in response to changes in the vertical position of the sensor 211. It should be appreciated that other techniques may be employed. For example, processing techniques may process the data obtained by the sensors 211 to exclude the features of the unharvested crop field that are determined to be outside of the lateral extent 203 of the header 200 (e.g., determined based at least in part on inputs related to the vertical position of the sensor 211).

As noted above, it should be appreciated that an entirety of the bracket 214 may extend laterally-inwardly from the arm 221 or the bracket 214, as shown in FIG. 6. In particular, the bracket 214 may extend from the arm 221 at an angle that positions the sensor 211 laterally-inwardly of the lateral edge 202 of the header 200.

Figure 7:
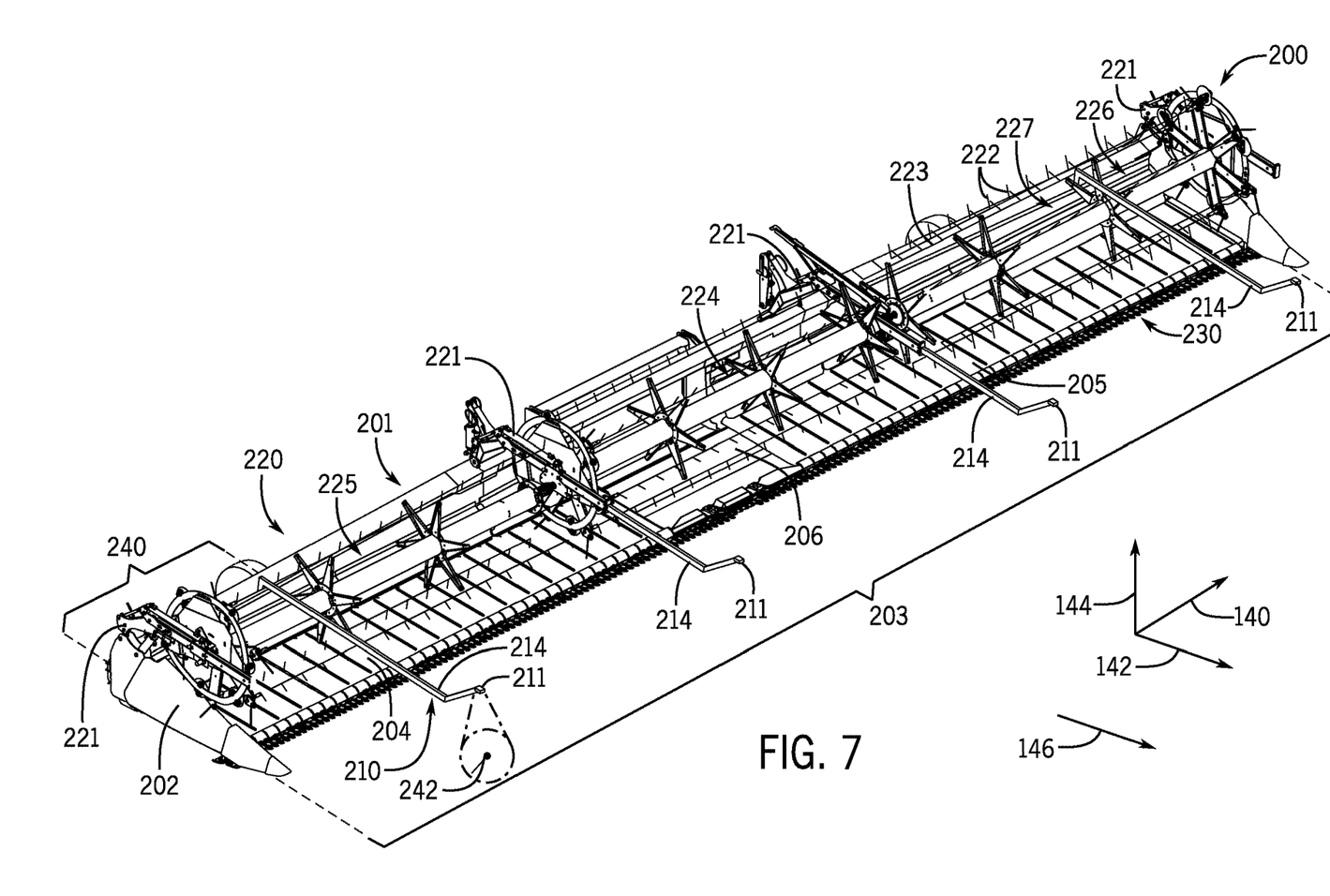
FIG. 7 is a perspective view of the header and the sensor assembly that may be used in the harvester of FIG. 1, wherein the sensor assembly is coupled to a frame of the header at a position that is laterally-inward of the lateral edges of the header, in accordance with embodiments of the present disclosure.

Additionally, the sensors 211 may be coupled to the header 200 in other ways. For example, FIG. 7 is a perspective view of an embodiment of the header 200 and the sensor assembly 210 that may be used in the harvester 100 of FIG. 1. As shown, the sensor assembly 210 is coupled to the frame 201 of the header 200 at a position that is laterally-inward of the lateral edges 202 of the header 200. In particular, the brackets 214 are coupled to (e.g., directly coupled to; in contact with; extends from) the frame 201 at a position that is laterally-inward of the lateral edges 202 of the header 200. The brackets 214 may extend up and over the reel assembly 220 and the cutter bar assembly 230. In this way, the sensors 211 may be positioned to effectively detect the relevant features of the unharvested crop field that are forward of the header 200 and/or within the lateral extent 203 of the header 200. For example, each of the laterally-outer sensors 211 may be positioned laterally-inward of the respective lateral edge 202 of the header 200 by a distance 240 that approximately equals (e.g., within 1, 2, 3, 4, 5, 10, 15, or 20 percent) and/or is less than a radius 242 of the detected area 213. In some embodiments, some of the sensors 211 (e.g., the laterally-inner sensors 211) may be coupled to and supported by the arms 221 of the reel assembly 220, as shown in FIGS. 2-6, while other sensors 211 (e.g., the laterally-outer sensors 211) may be coupled to and supported by the frame 201 of the header 200, as shown in FIG. 7.

Additionally or alternatively, it may be desirable to orient one or more of the sensors 211 such that a central axis of the field of view 212 of the sensor 211 is at a non-parallel angle relative to the vertical axis 144 of the header 200. Such a configuration may enable the detected area 213 to be laterally-inward of the lateral edges 202 of the header 200, even while the sensor 211 is positioned on the laterally-outer arm 221 or otherwise positioned proximate to the lateral edge 202 of the header 200.

Figure 8:
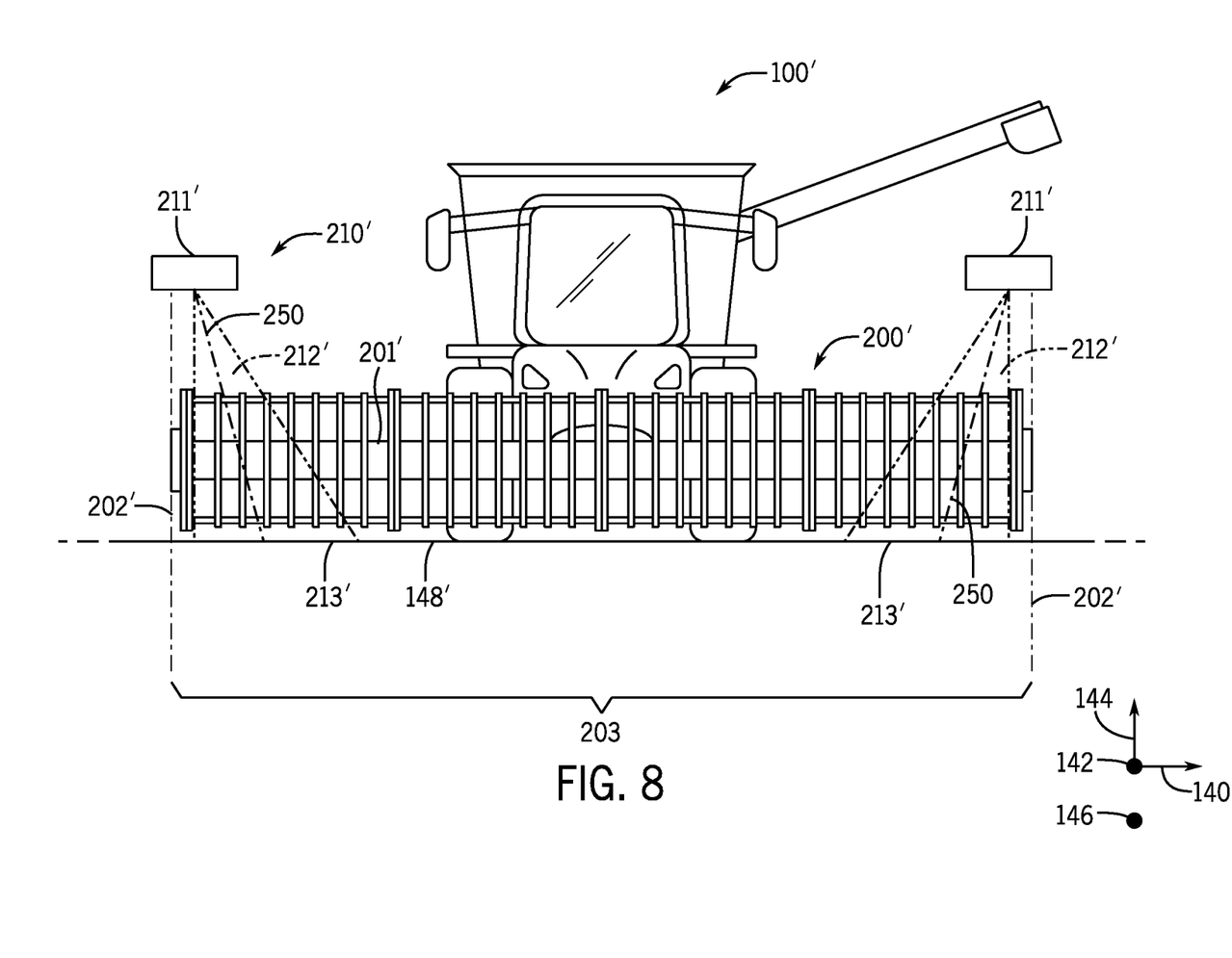
FIG. 8 is a front view of a harvester having a header and a sensor assembly, wherein each sensor of the sensor assembly is configured and/or oriented to detect a respective detected area that is laterally-inward of lateral edges of the header, in accordance with embodiments of the present disclosure.

For example, FIG. 8 illustrates a harvester 100' having a header 200' and a sensor assembly 210'. As shown, at least two of the sensors 211' may be positioned proximate to the lateral edges 202' of the header 200'. If the sensors 211' were oriented so that a central axis 250 of their field of view 212' was aligned with the vertical axis 144' of the header 200', the detected area 213' would extend laterally outside of the lateral edges 202' of the header 200'. However, as shown, the central axis 250 of the field of view 212' is angled (e.g., non-parallel) relative to the vertical axis 144' of the header 200', which may cause the detected area 213' to be substantially or completely within the lateral extent 203' of the header 200'. It should be appreciated that the central axis 250 of the field of view 212' may be angled (e.g., in a plane that is not aligned with the vertical axis 144') to cause the detected area 213' to be forward of the header 200. The harvester 100' may also include additional sensors 211' that are positioned at other locations along the header 200' that are oriented such that their field of view 212' is aligned with (e.g., parallel to) the vertical axis 144' of the header 200'.

It should be appreciated that the sensor 211' (e.g., the housing) may be mounted on the bracket 214' (FIG. 9) or otherwise coupled to the header 200' in a manner that causes the central axis 250 of the field of view 212' to be angled relative to the vertical axis 144' of the header 200' (e.g., the sensor 211' is rotated on the bracket 214'), or the sensor 211' itself may be modified to direct its field of view 212' at the angle relative to the vertical axis 144' of the header 200'.

Figure 9:
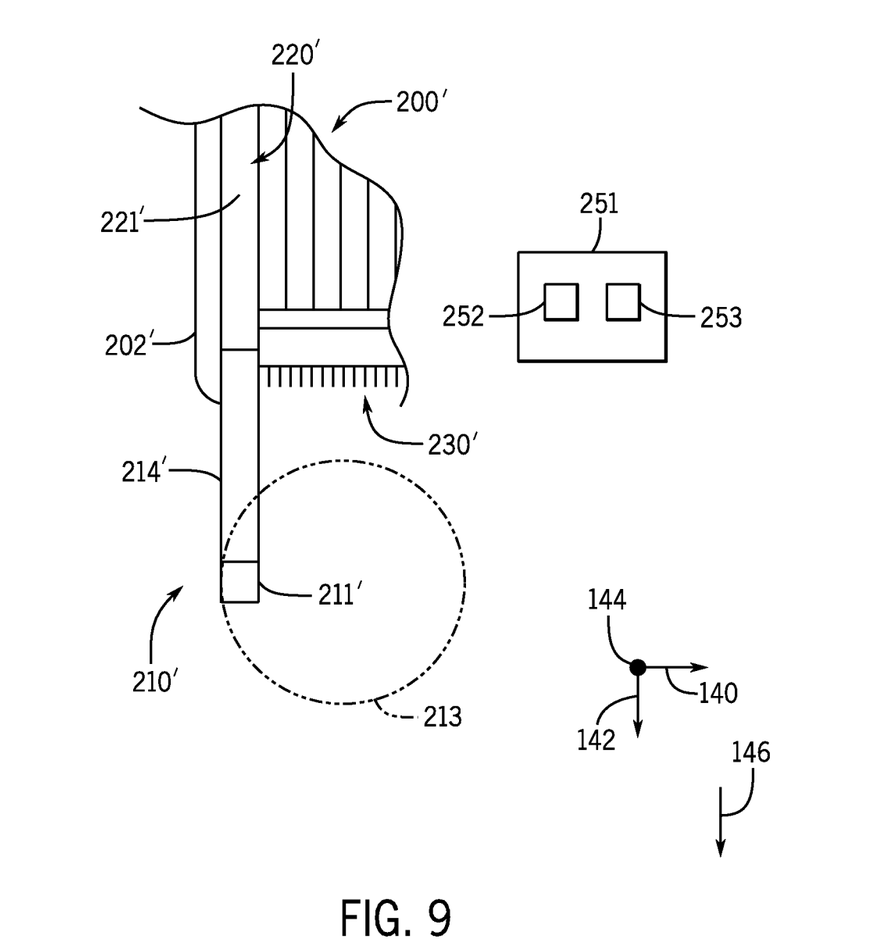
FIG. 9 is a top view of a portion of the header and the sensor assembly that may be used in the harvester of FIG. 8, wherein the sensor assembly is coupled to a reel arm via a bracket, in accordance with embodiments of the present disclosure.

FIG. 9 is a top view of a portion of the header 200' and the sensor assembly 210' of FIG. 8. As shown, the sensor assembly 210' includes the bracket 214', which may be coupled to the arm 221' of the reel assembly 220'. The detected area 213' is offset laterally-inwardly (e.g., the detected area 213' is not centered below the sensor 211'), and in particular, the detected area 213' is offset laterally-inwardly such that the detected area 213 is substantially or completely within the lateral extent 203 of the header 200 (e.g., does not extend laterally outside of the lateral edges 202 of the header 200).

In some embodiments, a laterally-outer edge of the detected area 213' may substantially align with the lateral edge 202' of the header 200' (e.g., along the lateral axis 140'). It should be appreciated that, in some embodiments, the detected area 213 may be offset laterally-inwardly such that the detected area 213 is substantially within the lateral extent 203' of the header 200' (e.g., at least 95, 90, 85, 80, 75, 70, 65, 60, 55, or 50 percent of the detected area 213' is laterally-inward of the lateral edge 202' of the header 200'). Additionally, as discussed above, the arm 221' may move vertically. Accordingly, it may be desirable to adjust the field of view 212' and/or the orientation of the sensor 211' relative to the vertical axis 140' based on the height of the sensor 211'. For example, the electronic controller may receive an indication of the vertical position of the sensor 211' and then control an actuator to rotate the sensor 211' relative to the frame 201' of the header 200' to adjust the orientation of the sensor 211' to keep the detected area 213' substantially or completely within the lateral edges 202' of the header 200'. Thus, the orientation of the sensor 211' may adjust automatically in response to changes in the vertical position of the sensor 211'.

As discussed herein, certain components may be coupled to an electronic controller having a processor and a memory. The electronic controller may control operation of the sensor 211, 211' and/or process signals received from the sensor 211, 211'. The processor may receive signals indicative of the height of the sensor 211, 211', and the processor may instruct an actuator to adjust the bracket 214, 214', the sensor 211, 211', or another component of the sensor assembly 210. An electronic controller 251 having a processor 252 and a memory 253 is shown in FIG. 9 as an example, and it should be understood that these components may be included in any of the sensor assemblies 210, 210' described herein to carry out any of the functions described herein.

The processor may be any suitable type of computer processor or microprocessor capable of executing computer-executable code. The processor may also include multiple processors that may perform the operations described herein. The memory may represent non-transitory computer-readable media (e.g., any suitable form of memory or storage) that may store the processor-executable code used by the processor to perform various techniques described herein. It should be noted that non-transitory merely indicates that the media is tangible and not a signal.

While only certain features have been illustrated and described herein, many modifications and changes will occur to those skilled in the art. It is, therefore, to be understood that the appended claims are intended to cover all such modifications and changes as fall within the true spirit of the disclosure. It should also be understood that any of the features of FIGS. 1-9 may be combined in any suitable manner. For example, at least some of the sensors 211 of FIGS. 1-7 may be oriented at an angle relative to the vertical axis 144 in the manner shown and described with respect to FIGS. 8 and 9.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A sensor assembly for an agricultural header, comprising:
   a sensor configured to detect a feature of an unharvested crop field;
   a bracket comprising a first end portion configured to couple to a reel arm of the agricultural header and a second end portion coupled to the sensor, wherein the sensor assembly is configured to:
     orient the sensor such that a central axis of a field of view of the sensor is at a non-parallel angle relative to a vertical axis of the agricultural header; and
     adjust the field of view, the non-parallel angle, or both based on a vertical position of the reel arm while the sensor assembly is coupled to the agricultural header; and
   an actuator configured to drive, based on instructions from an electronic controller, rotation of the sensor relative to the bracket to adjust the non-parallel angle based on the vertical position of the reel arm while the sensor assembly is coupled to the agricultural header and as the agricultural header travels through the unharvested crop field.

2. The sensor assembly of claim 1, wherein the sensor assembly is configured to position the sensor forward of a cutter bar assembly relative to a direction of travel while the sensor assembly is coupled to the agricultural header.

3. The sensor assembly of claim 1, wherein the non-parallel angle is configured to cause the sensor to detect only the feature of the unharvested crop field within a detected area that is completely within a lateral extent of the agricultural header while the sensor assembly is coupled to the agricultural header.

4. The sensor assembly of claim 1, wherein the bracket is configured to position the second end portion of the bracket and the sensor laterally-inwardly of the first end portion of the bracket while the sensor assembly is coupled to the agricultural header.

5. The sensor assembly of claim 1, wherein the bracket is configured to extend forward from the reel arm of the agricultural header relative to a direction of travel while the bracket is coupled to the reel arm.

6. The sensor assembly of claim 5, wherein at least a portion of the bracket is configured to extend at a non-parallel angle relative to a longitudinal axis of the agricultural header while the bracket is coupled to the reel arm.

7. The sensor assembly of claim 1, comprising:
   an additional sensor configured to detect the feature of the unharvested crop field; and an additional bracket comprising a respective first end portion configured to couple to an additional reel arm of the agricultural header and a respective second end portion coupled to the additional sensor, wherein the sensor assembly is configured to orient the additional sensor such that a respective central axis of a respective field of view of the additional sensor is at a respective non-parallel angle relative to the vertical axis of the agricultural header while the sensor assembly is coupled to the agricultural header.

8. The sensor assembly of claim 7, wherein the sensor is coupled to the reel arm that is positioned on a first lateral end portion of the agricultural header, and the additional sensor is coupled to the additional reel arm that is positioned at a second lateral end portion of the agricultural header.

9. The sensor assembly of claim 1, comprising:
one or more additional sensors configured to detect the feature of the unharvested crop field; and
one or more additional brackets, wherein each additional bracket of the one or more additional brackets comprises a respective first end portion configured to couple to a respective reel arm of the agricultural header or a frame of the agricultural header and a respective second end portion coupled to a respective sensor of the one or more additional sensors, wherein the sensor and each additional sensor of the one or more additional sensors are positioned and oriented to detect only the feature of the unharvested crop field within a respective detected area that is completely within a lateral extent of the agricultural header while the sensor assembly is coupled to the agricultural header.

10. The sensor assembly of claim 9, wherein the sensor and the one or more additional sensors are distributed across a width of the agricultural header.

11. The sensor assembly of claim 10, wherein the sensor is positioned on a first lateral end portion of the header, a first additional sensor of the one or more additional sensors is positioned on a second lateral end portion of the header, and a second additional sensor of the one or more additional sensors is positioned between the sensor and the first additional sensor of the one or more additional sensors along the width of the agricultural header.

12. The sensor assembly of claim 1, wherein the non-parallel angle is configured to cause the sensor to detect only the feature of the unharvested crop field within a detected area that is substantially aligned with a lateral edge of the agricultural header while the sensor assembly is coupled to the agricultural header.

13. The sensor assembly of claim 12, wherein less than 20 percent of the detected area extends laterally-outwardly of the lateral edge of the agricultural header while the sensor assembly is coupled to the agricultural header.

14. The sensor assembly of claim 1, wherein the feature comprises a height of a crop in the unharvested crop field, a density of the crop in the unharvested crop field, or a color of the crop in the unharvested crop field.

15. The sensor assembly of claim 1, wherein the sensor comprises an acoustic sensor, an optical sensor, or a radar sensor.

16. The sensor assembly of claim 1, wherein the bracket is configured to move with the reel arm vertically relative to a frame of the agricultural header.

17. The sensor assembly of claim 16, wherein the sensor assembly is configured to adjust the field of view, the non-parallel angle, or both based on the vertical position of the reel arm such that a detected area remains completely within lateral edges of the agricultural header as the bracket moves with the reel arm vertically relative to the frame of the agricultural header.

18. The sensor assembly of claim 16, wherein the electronic controller is configured to receive signals indicative of the vertical position of the reel arm and to instruct an actuator to adjust the non-parallel angle, instruct the sensor to adjust the field of view, or both based on the signals indicative of the vertical position of the reel arm.

19. The sensor assembly of claim 16, wherein the electronic controller is configured to instruct the sensor to adjust the field of view based on the vertical position of the reel arm.

* * * * *